(12) United States Patent
Woo et al.

(10) Patent No.: US 11,106,606 B2
(45) Date of Patent: Aug. 31, 2021

(54) EXPLOITING INPUT DATA SPARSITY IN NEURAL NETWORK COMPUTE UNITS

(71) Applicant: Google LLC, Mountain View, CA (US)

(72) Inventors: Dong Hyuk Woo, San Jose, CA (US); Ravi Narayanaswami, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/514,562

(22) Filed: Jul. 17, 2019

(65) Prior Publication Data

US 2020/0012608 A1    Jan. 9, 2020

Related U.S. Application Data

(63) Continuation of application No. 15/336,066, filed on Oct. 27, 2016, now Pat. No. 10,360,163.

(51) Int. Cl.
*G06F 13/16*    (2006.01)
*G06N 20/00*    (2019.01)
(Continued)

(52) U.S. Cl.
CPC .......... *G06F 13/1668* (2013.01); *G06F 9/38* (2013.01); *G06F 15/76* (2013.01); *G06F 17/16* (2013.01);
(Continued)

(58) Field of Classification Search
CPC ........................................................ G06N 3/00
See application file for complete search history.

(56) References Cited

U.S. PATENT DOCUMENTS 3,754,128 A    8/1973 Corinthios
5,267,185 A    11/1993 Akabane
(Continued)

FOREIGN PATENT DOCUMENTS

CN    1445715    10/2003
CN    101441441    6/2010
(Continued)

OTHER PUBLICATIONS

'cs231n.github.io' [online]. "CS231n Convolutional Neural Networks for Visual Recognition," publication date not available, [retrieved on Oct. 22, 2016]. Retrieved from the Internet: URL<http://cs231n.github.io/neuralnetworks1/>. 13 pages.
(Continued)

*Primary Examiner* — Henry Tsai
*Assistant Examiner* — Juanito Borromeo
(74) *Attorney, Agent, or Firm* — Fish & Richardson P.C.

(57) ABSTRACT

A computer-implemented method includes receiving, by a computing device, input activations and determining, by a controller of the computing device, whether each of the input activations has either a zero value or a non-zero value. The method further includes storing, in a memory bank of the computing device, at least one of the input activations. Storing the at least one input activation includes generating an index comprising one or more memory address locations that have input activation values that are non-zero values. The method still further includes providing, by the controller and from the memory bank, at least one input activation onto a data bus that is accessible by one or more units of a computational array. The activations are provided, at least in part, from a memory address location associated with the index.

20 Claims, 5 Drawing Sheets

(51) Int. Cl.

| | |
|---|---|
| *G06N 3/10* | (2006.01) |
| *G06F 15/76* | (2006.01) |
| *G06F 9/38* | (2018.01) |
| *G06N 3/04* | (2006.01) |
| *G06N 20/10* | (2019.01) |
| *G06F 17/16* | (2006.01) |
| *G06N 5/04* | (2006.01) |
| *G06N 3/063* | (2006.01) |
| *G06N 3/08* | (2006.01) |

(52) U.S. Cl.
CPC ........... *G06N 3/0454* (2013.01); *G06N 3/063* (2013.01); *G06N 3/08* (2013.01); *G06N 3/10* (2013.01); *G06N 5/04* (2013.01); *G06N 20/00* (2019.01); *G06N 20/10* (2019.01); *Y02D 10/00* (2018.01)

(56) References Cited

U.S. PATENT DOCUMENTS

| | | |
|---|---|---|
| 5,287,464 A | 2/1994 | Kumar |
| 5,299,146 A | 3/1994 | Kanoh |
| 5,400,271 A | 3/1995 | Himeno |
| 5,422,983 A | 6/1995 | Castelaz et al. |
| 5,742,741 A | 4/1998 | Chiueh et al. |
| 5,905,757 A | 5/1999 | Kundmann |
| 6,067,536 A * | 5/2000 | Maruyama ......... G06K 9/00986 706/25 |
| 7,426,501 B2 | 9/2008 | Nugent |
| 7,493,498 B1 | 2/2009 | Schmidt |
| 7,818,729 B1 | 10/2010 | Plum |
| 8,321,652 B2 | 11/2012 | Hinz |
| 8,806,171 B2 | 8/2014 | Seong |
| 9,323,525 B2 | 4/2016 | Kim |
| 9,477,628 B2 | 10/2016 | Knies |
| 9,606,797 B2 | 3/2017 | Vaidya |
| 9,710,265 B1 | 7/2017 | Ternam et al. |
| 9,818,059 B1 | 11/2017 | Woo et al. |
| 9,836,691 B1 | 12/2017 | Narayanaswami et al. |
| 9,875,104 B2 | 1/2018 | Woo et al. |
| 9,959,498 B1 | 5/2018 | Narayanaswami et al. |
| 2002/0044695 A1 | 4/2002 | Bostrom |
| 2009/0128571 A1 | 5/2009 | Smith |
| 2010/0030999 A1 | 2/2010 | Hinz |
| 2011/0145447 A1 | 6/2011 | Dimond |
| 2011/0161624 A1 | 6/2011 | Flachs et al. |
| 2012/0143932 A1 | 6/2012 | Fossum |
| 2012/0173004 A1 | 7/2012 | Radl |
| 2012/0303615 A1 | 11/2012 | Goswami et al. |
| 2013/0073497 A1 | 3/2013 | Akopyan et al. |
| 2014/0114893 A1 | 4/2014 | Arthur et al. |
| 2016/0314826 A1 | 10/2016 | Augustine |
| 2016/0322042 A1* | 11/2016 | Vlietinck ................ G06N 3/08 |
| 2017/0103301 A1 | 4/2017 | Henry |
| 2017/0316307 A1 | 11/2017 | Koster et al. |
| 2018/0197068 A1 | 7/2018 | Narayanaswami et al. |
| 2020/0012608 A1 | 1/2020 | Woo et al. |

FOREIGN PATENT DOCUMENTS

| | | |
|---|---|---|
| CN | 102037652 | 4/2011 |
| CN | 102004751 | 4/2014 |
| CN | 106023065 | 10/2016 |
| CN | 106127297 | 11/2016 |
| CN | 106529511 | 3/2017 |
| CN | 104463209 | 5/2017 |
| CN | 106023065 | 2/2019 |
| EP | 0422348 | 4/1991 |
| EP | 0156648 | 9/1992 |
| EP | 0586999 | 3/1999 |
| JP | S48-74139 | 10/1973 |
| JP | S53-64439 | 6/1978 |
| JP | S58-134357 | 8/1983 |
| JP | 2001-117900 | 4/2001 |
| WO | WO 2005067572 | 12/2005 |

OTHER PUBLICATIONS

'pages.cs.wisc.edu' [online]. "A Basic Introduction to Neural Networks," Apr. 30, 1996, [retrieved on Oct. 22, 2016]. Retrieved from the Internet: URL<http://pages.cs.wisc.edu/~bolo/shipyard/neural/local.html.> 5 pages.

A neural-network-based space-vector PWM controller for a three-level voltage-fed inverter induction motor drive S. K. Mondal; J. O. P. Pinto; B. K. Bose IEEE Transactions on Industry Applications Year: 2002, vol. 38, Issue: 3 pp. 660-669, DOI: 10.1109/TIA.2002.1003415 IEEE Journal & Publications.

Chen et al., "DaDianNao: A Machine-Learning Supercomputer," Proceedings of the 47th Annual IEEE/ACM International Symposium on Microarchitecture. IEEE Computer Society, 2014, 14 pages.

Chen et al., "DianNao: A Small-Footprint High-Throughput Accelerator for Ubiquitous Machine-Learning," ACM Sigplan Notices, Mar. 2014, vol. 49. No. 4. ACM, 15 pages.

Chi et al., "PRIME: A Novel Processing-in-memory Architecture for Neural Network Computation in ReRAM-based Main Memory," Proceedings of ISCA, 2016, vol. 43, 13 pages.

Hexpo: A vanishing-proof activation function Shumin Kong; Masahiro Takatsuka 2017 International Joint Conference on Neural Networks (IJCNN) Year: 2017 pp. 2562-2567, DOI: 10.1109/IJCNN.2017.7966168 IEEE Conference Publications.

Improvement of learning for CNN with ReLU activation by sparse regularization Hidenori Ide; Takio Kurita 2017 International Joint Conference on Neural Networks (IJCNN) Year: 2017 pp. 2684-2691, DOI: 10.1109/IJCNN.2017.7966185 IEEE Conference Publications.

International Search Report and Written Opinion issued in International Application No. PCT/US2017/046963, dated Nov. 16, 2017, 17 pages.

International Search Report and Written Opinion issued in International Application No. PCT/US2017/047992, dated Nov. 16, 2017, 14 pages.

International Search Report and Written Opinion issued in International Application No. PCT/US2017/049165 dated Dec. 1, 2017, 15 pages.

Kim et al. "A Large-scale Architecture for Restricted Boltzmann Machines," IEEE International Symposium on Field-Programmable Custom Computing Machines, May 2, 2010, 8 pages.

Liu et al., "Cambricon: an instruction set architecture for neural networks," Proceedings of the 43rd ACM/IEEE International Symposium on Computer Architecture (ISCA'16), 2016, pp. 393-405.

Moons et al. "A 0.3-2.6 TOPS/W precision-scalable processor for real-time large-sclae ConvNets," IEEE Symposium on VLSI Circuits, Jun. 15, 2016, 2 pages.

Office Action issued in British Application No. GB1714815.6, dated Feb. 8, 2018, 9 pages.

Office Action issued in British Application No. GB1715032.7, dated Feb. 27, 2018, 6 pages.

Peemen et al. "Memory-centric accelerator design for Convolutional Neural Networks," 2013 IEEE 31st International Conference on Computer Design, Oct. 1, 2013, 7 pages.

PID-Like Neural Network Nonlinear Adaptive Control for Uncertain Multivariable Motion Control Systems S. Cong; Y. Liang IEEE Transactions on Industrial Electronics Year: 2009, vol. 56, Issue: 10 pp. 3872-3879, DOI: 10.1109/TIE.2009.2018433 IEEE Journals & Magazines.

Shafiee et al. "ISAAC: A Convolutional Neural Network Accelerator with In-Situ Analog Arithmetic in Crossbars," 2016 ACM/IEEE $43^{rd}$ Annual International Symposium on Computer Architecture, Jun. 18, 2016, 13 pages.

Zhang et al. "Optimizing FPGA-based Accelerator Design for Deep Convolutional Neural Networks," Proceedings of the 2015 ACM/SIGDA International Symposium on Filed-Programmable Gate Arrays, Feb. 22, 2015, 10 pages.

Written Opinion issued in International Application No. PCT/US2017/047992, dated Sep. 27, 2018, 7 pages.

PCT International Preliminary Report on Patentability in International Appln. No. PCT/US2017/047992, dated May 9, 2019.

(56) References Cited

OTHER PUBLICATIONS

CN Office Action in Chinse Application No. 201710889996.X, dated Jun. 24, 2020, 17 pages.

SG Written Opinion in Singaporean Application No. 11201903787Y, dated Apr. 20, 2020, 4 pages.

"Bendersky, Memory layout of multi-dimensional arrays, Sep. 26, 2015, 12 pages, [retrieved from the internet on May 15, 2020], retrieved from URL <https://eli.thegreenplace.net/2015/nnennory-layout-of-multi-dimensional-arrays>"

CN Office Action in Chinese Application No. 201710889996.X, dated Jan. 25, 2021, 14 pages (with English translation).

EP Office Action in European Application No. 17765517.2, dated Aug. 11, 2020, 11 pages.

JP Office Action in Japanese Application No. 2019-522728, dated Dec. 1, 2020, 33 pages (with English translation).

JP Office Action in Japanese Application No. 2019-522877, dated Aug. 24, 2020, 30 pages (with English translation).

Kaiwuan Guo et al, "Angel-Eye: A Complete Design Flow for Mapping CNN onto Customized Hardware" Proceedings of the 2016 IEEE Computer Society Annual Symposium on VLSI (ISVLSI), Jul. 13, 2016, pp. 24-29, ISBN: 978-1-4673-9039-2, DOI: 10.1109/ISVLSI.2016.129.

KR Office Action in Korean Application No. 10-2019-7012085, dated Jan. 4, 2021, 10 pages (with English translation).

Murugan Sankaradas et al, "A Massively Parallel Coprocessor for Convolutional Neural Networks" Proceedings of the 2009 20th IEEE International Conference on Application-specific Systems, Architectures and Processors, Jul. 9, 2009, pp. 53-60, ISSN: 1063-6862, DOI: 10.1109/ASAP.2009.25.

Satoshi Tsuda et al., Proposal of Synthetic Aperture Radar Information Structurization by Using Neural Networks, IEICE Technical Report, vol. 115, No. 200, Institute of Electronics, Information and Communication Engineers, Aug. 20, 2015, pp. 31-26, ISSN: 0913-5685.

SG Examination Report in Singaporean Application No. 11201903787Y, dated Jan. 8, 2021, 3 pages.

Sitoh, "Deep Learning from Scratch—Deep learning theory and implementation—python" O'Reilly Japan, Sep. 2016, 12 pages.

Tianshi Chen et al, "DianNao: A Small-Gootprint High-Throughput Accelerator for Ubiquitous Machine Learning" ACM SIGARCH Computer Architecture News, vol. 42, No. 1, Feb. 2014, pp. 269-283, DOI: 10.1145.2654822.2541967.

Uchizono et al, "Multiscale Transform for Dynamix Graph Signals" IEICE Technical Report, Jan. 2016, 12 pages.

Watanabe et al, "A Cooperative Learning Algorithm for Multi-Layered Neural Networks by using a PC cluster" IEICE Technical Report, Nov. 2000, 11 pages.

CN Office Action in Chinese Application No. 201710909908.8, dated May 19, 2021, 22 pages (with English translation).

Hoshi et al., "Neural Network Hardware Eliminating Negligible Connections" IEICE, 1996, 2 pages (abstract only).

JP Office Action in Japanese Application No. 2019-523062, dated Apr. 7, 2021, 11 pages (with English translation).

Liu et al., "Efficient Sparse Matric-Vector Multiplication on x86-Based Many-Core Processors" ICS' Jun. 13, 2013, 10 pages.

Mukunoki et al., "Implementation and Evaluation of Sparse Matric Iterative Solution Using Wuadruple-Preciion Operations on GPUs" IPSJ SIG Technical Report, 2013, 9 pages.

Sato et al., "Sparse-Matrix Processor Based on Content Addressable Memory" IPSJ SIG Technical Report, 1990, 6 pages.

Zhang et l, "Error Evaluation for the Preconditioner Computer with Sherman-Morrison Formula and Its Re-construction" IPSJ SIG Technical Report, 2006, 6 pages.

\* cited by examiner

EXPLOITING INPUT DATA SPARSITY IN NEURAL NETWORK COMPUTE UNITS

This application is a continuation of U.S. patent application Ser. No. 15/336,066, filed on Oct. 27, 2016. The prior application is incorporated herein by reference in its entirety.

BACKGROUND

This specification relates to performing machine learning computations using a special purpose computational unit.

Neural networks are machine learning models that employ one or more layers of models to generate an output, e.g., a classification, for a received input. Some neural networks include one or more hidden layers in addition to an output layer. The output of each hidden layer is used as input to the next layer in the network, i.e., the next hidden layer or the output layer of the network. Each layer of the network generates an output from a received input in accordance with current values of a respective set of parameters.

Some neural networks include one or more convolutional neural network layers. Each convolutional neural network layer has an associated set of kernels. Each kernel includes values established by a neural network model created by a user. In some implementations, kernels identify particular image contours, shapes, or colors. Kernels can be represented as a matrix structure of weight inputs. Each convolutional layer can also process a set of activation inputs. The set of activation inputs can also be represented as a matrix structure.

SUMMARY

One way of computing convolution calculations requires numerous matrix multiplications in a large dimensional space. A processor or controller device of a compute unit can compute matrix multiplications through a brute force method. For example, although compute-intensive and time-intensive, the processor can repeatedly calculate individual sums and products for convolution calculations. The degree to which the processor parallelizes calculations is limited due to its architecture.

An innovative aspect of the subject matter described in this specification can be embodied in a computer-implemented method. The method includes receiving, by a computing device, a plurality of input activations, the input activations being provided, at least in part, from a source external to the computing device and determining, by a controller of the computing device, whether each of the plurality of input activations is one of a zero value or a non-zero value. The method further includes storing, in a memory bank of the computing device, at least one input activation, wherein storing the at least one of the input activations includes generating, by the controller, an index comprising one or more memory address locations having input activation values that are non-zero values. The method still further includes providing, by the controller and from the memory bank, at least one input activation onto a data bus that is accessible by one or more units of a computational array, wherein the activations are provided, at least in part, from a memory address location associated with the index.

In some implementations, the index is created based on a bitmap comprising a plurality of bits and, wherein each bit of the bitmap indicates at least one of a non-zero input activation value or a zero input activation value. In some implementations, the method further includes, providing a first input activation that has a non-zero value to perform, by at least one unit, a computation using the non-zero value, and subsequently providing a second input activation that has a zero value, and preventing, in at least one unit, computation that would otherwise be performed using the zero value.

In some implementations, preventing occurs in response to the controller determining that the input activation is provided from a memory address location that is not associated with the index. In some implementations, the method further includes, detecting, by the controller, that the input activation is provided from a memory address location that is not associated with the index, and, in response to detecting, providing a control signal to at least one unit of the computational array to prevent a multiply operation associated with the zero input activation value.

In some implementations, the method further comprises, mapping, by the controller and to a first unit, a first portion of a tensor computation that uses a first input activation and mapping, to a second unit that differs from the first unit, a second portion of the tensor computation that also uses the first input activation. In some implementations, the method further comprises, sequentially providing a single input activation onto the data bus, the single input activation being accessed and selected from memory address locations that are associated with the index. In some implementations, providing further comprises, not providing input activations that have a zero value.

Another innovative aspect of the subject matter described in this specification can be embodied in one or more machine-readable storage devices storing instructions that are executable by one or more processing devices to perform operations comprising, receiving, by a computing device, a plurality of input activations, the input activations being provided, at least in part, from a source external to the computing device and determining, by a controller of the computing device, whether each of the plurality of input activations is one of a zero value or a non-zero value. The operations further comprise storing, in a memory bank of the computing device, at least one of the input activations, wherein storing the at least one input activation includes generating, by the controller, an index comprising one or more memory address locations having input activation values that are non-zero values. The operations still further comprise providing, by the controller and from the memory bank, at least one input activation onto a data bus that is accessible by one or more units of a computational array, wherein the activations are provided, at least in part, from a memory address location associated with the index.

Another innovative aspect of the subject matter described in this specification can be embodied in an electronic system comprising a controller disposed in a computing device, the controller including one or more processing devices; and one or more machine-readable storage devices for storing instructions that are executable by the one or more processing devices to perform operations comprising: receiving, by the computing device, a plurality of input activations, the input activations being provided, at least in part, from a source external to the computing device; and determining, by the controller, whether each of the plurality of input activations is one of a zero value or a non-zero value. The operations further comprise, storing, in a memory bank of the computing device, at least one of the input activations, wherein storing the at least one input activation includes generating an index comprising one or more memory address locations having input activation values that are non-zero values. The operations still further comprise, providing, by the controller and from the memory bank, at least one input activation onto a data bus that is accessible by one or more units of a computational array, wherein the activations are provided, at least in part, from a memory address location associated with the index.

The subject matter described in this specification can be implemented in particular embodiments so as to realize one or more of the following advantages. Activations accessible from a first memory and a weights accessible from a second memory, in a single compute system, can be traversed based on memory address values retrieved from registers. A controller of the compute system can compress activation data by storing only non-zero values in first memory, thereby saving memory storage space and corresponding bandwidth. Matrix multiplications occur in the compute system based, in part, on primarily providing non-zero input activations. Moreover, when the compute system uses a communication scheme that includes primarily non-zero activation values, computational efficiency can be enhanced or accelerated by eliminating multiplication by zeros.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The subject matter described in this specification relates to reducing computations that occur within a compute unit or tile of an example neural network hardware computing system. In general, as part of computing a neural network inference, an input activation is multiplied with a parameter or weight value to produce an output activation. Due to the algorithmic properties of computing inferences for deep neural networks, a large fraction of input activations are zero. In other words, current compute units perform a large number of unnecessary computations that include multiplying one number (e.g., a weight) against zero (input activation value).

This specification describes, in part, a more efficient activation storage and communication scheme as well as a custom architecture design for deep neural network processing, especially for processing convolutional layers of a neural network. Unlike conventional hardware accelerators that perform dense matrix multiplication over time, this specification describes an architecture that can 1) skip or bypass a computation upon seeing zero input values; and 2) reduce memory usage in a compute unit by storing compressed input activations that include only non-zero values. Overall, through the teachings of this specification, compute unit performance for neural network inference computations is improved and energy savings are realized by skipping unnecessary computations.

Figure 1:
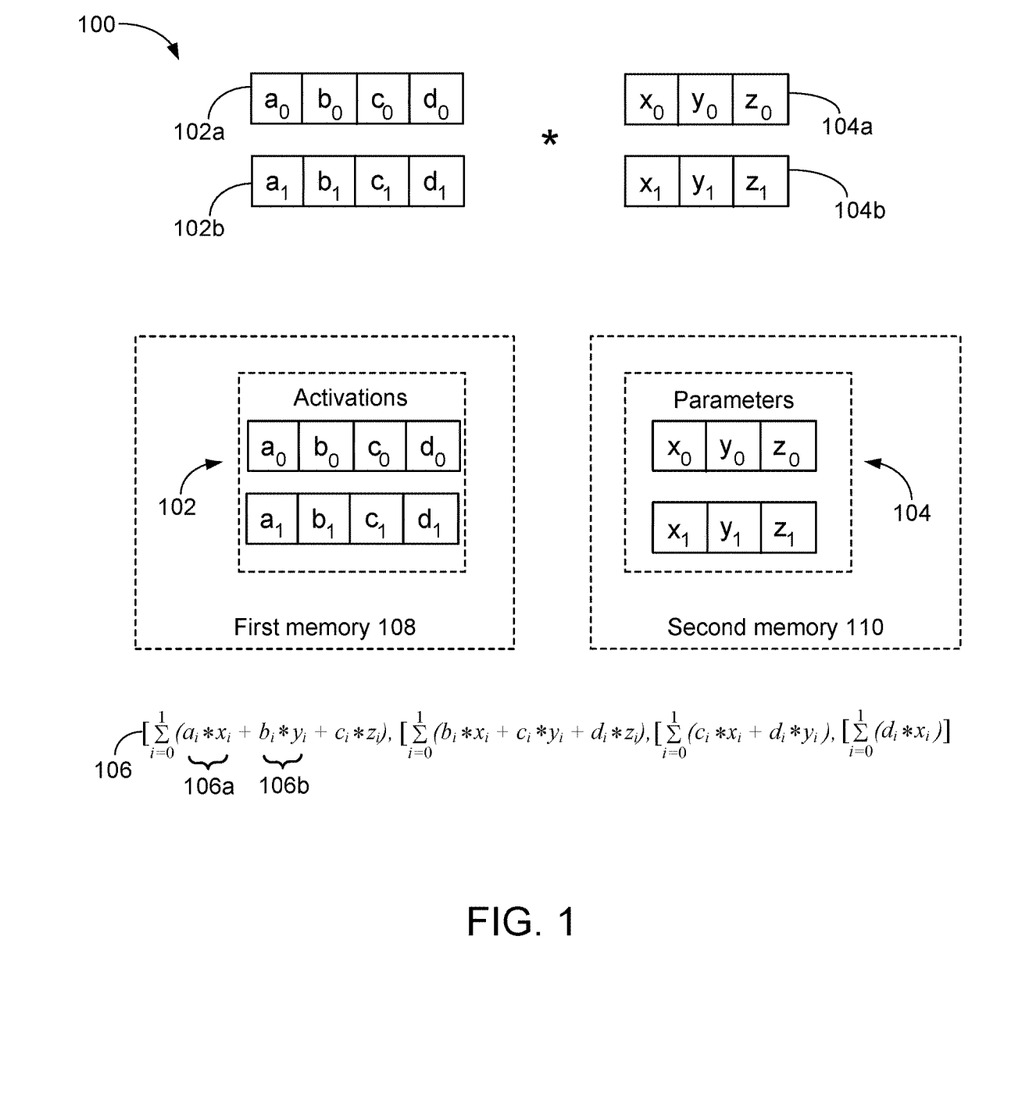
FIG. 1 illustrates an example computation structure that includes activations and parameters.

FIG. 1 illustrates an example computation structure 100 that includes an activation structure 102 and a parameter structure 104. Activation structure 102 can include a first data structure 102a including multiple data elements corresponding to a first input depth (denoted by subscript 0). Likewise, activation structure 102 can also include a second data structure 102b including multiple data elements corresponding to a second input depth (denoted by subscript 1). The multiple data elements shown in data structure 102a and 102b are indicated as $a_0$, $b_0$, $c_0$, $d_0$ and $a_1$, $b_1$, $c_1$, $d_1$, respectively. Each data element ($a_0$, $a_1$, $b_0$, $b_1$, $c_0$, $d_0$ and etc.) of the data structure 102a/b is an input activation value and each input depth corresponds to a depth of an input to a neural network layer. In some implementations, a neural network layer can have an input depth of one while in other implementations a neural network layer can have an input depth of more than one.

Parameter structure 104 can be described in a similar manner as activation structure 102. Parameter structure 104 includes a first data structure 104a and a second data structure 104b. Each data structure 104a/b can include multiple data elements that each contain kernel values. As shown in FIG. 1, the multiple data elements corresponding to data structure 104a and 104b are indicated as $x_0$, $y_0$, $z_0$ and $x_1$, $y_1$, $z_1$, respectively.

As discussed above, each layer of the neural network generates an output from a received input in accordance with values of a respective set of operands. Like other neural network layers, each convolutional layer can process a set of activation inputs that can be represented as a matrix structure. A convolutional neural network layer will also have an associated set of kernels that includes values and the kernels can also be represented as a matrix structure of weights. In FIG. 1, activation structure 102 can correspond to a matrix structure having one or more activation inputs and parameter structure 104 can correspond to a matrix structure having one or more kernels or weight parameters.

As described in more detail below, various layers of a neural network process machine learning inferences by performing large quantities of computations that include matrix multiplications. Computation processes performed within a neural network layer (e.g., a convolutional layer) can include multiplying an input activation (i.e., a first operand) with a weight (i.e., a second operand) on one or more cycles and performing an accumulation of products over many cycles. An output activation is generated based on multiply and accumulation operations performed on the two operands.

As shown, equation 106 provides an example series-sequence based mathematical operation that can be performed when an input activation associated with a certain data element of activation structure 102 is multiplied with a kernel value or weight/parameter associated with a certain data element of parameter structure 104. For example, in equation 106, when index "i" equals 0, the input activation associated with data element $a_0$ of activation structure 102 is multiplied with the weight/parameter associated with data element $x_0$ of parameter structure 104. Moreover, because equation 106 is, in part, a series based equation, additional multiply operations will occur between sets of operands that correspond to other data elements of activation structure 102 and parameter structure 104. In some implementations, multiplication of a set of operands can be produce a partial sum 106a/b for a particular output feature or activation. Hence, as shown in equation 106, partial sums can be added to produce an output feature.

Neural networks can be embodied in one or more hardware computing systems that include multiple computing units configured to accelerate machine learning inference workloads of a network layer. Each computing unit can process a sub-set of computations for a given layer. In some implementations, structure 100 can be embodied in one or more computing units that each include at least two memory banks and one or more multiply accumulate (MAC) cells that can collectively form a MAC array (described below).

In one example, a first memory bank 108 of an example computing unit stores data associated with activation structure 102 and can be configured to receive and write input activation values to memory address locations within memory bank 108. Likewise, a second memory bank 110 of the example computing unit stores data associated with parameter structure 104 and can be configured to receive and write weight values to memory address locations within memory bank 110. In this example, each element (e.g., $a_0$, $b_0$, $c_0$, $d_0$) of data elements 102a can be stored at a respective memory address of first memory bank 108. Similarly, each element (e.g., $x_0$, $y_0$, $z_0$) of data elements 104a can be stored at a respective memory address of second memory 110.

In some implementations, first memory bank 108 and second memory bank 110 are each a volatile memory unit or units. In some other implementations, memory bank 108 and memory bank 110 are each a non-volatile memory unit or units. Memory banks 108, 110 can also be another form of a computer-readable storage medium, such as a floppy disk device, a hard disk device, an optical disk device, or a tape device, a flash memory or other similar solid state memory device, or an array of devices, including devices in a storage area network or other configurations.

In general, a computing unit of a hardware computing system can include one or more registers to keep track of memory address values. The data elements of the matrix structure corresponding to activation structure 102 can be accessed from first memory bank 108 while data elements of the matrix structure corresponding to parameter structure 104 can be accessed from second memory bank 110. An example control device of the computing tile/compute unit can access and/or traverse data elements of the matrix structures based on address values that are accessible from the one or more registers. An example compute unit/tile including an example control device, activation structure 102, parameter structure 104, first memory bank 108, and second memory bank 110 are described more detail below with reference to FIG. 3.

Moreover, additional details and descriptions relating to hardware computing systems for accelerating neural network tensor computations and matrix-multiplications for neural network inference workloads are described in U.S. patent application Ser. No. 15/335,769, entitled "Neural Network Compute Tile," filed on Oct. 26, 2016. The entire disclosure of U.S. patent application Ser. No. 15/335,769 is expressly incorporated by reference herein in its entirety.

Figure 2:
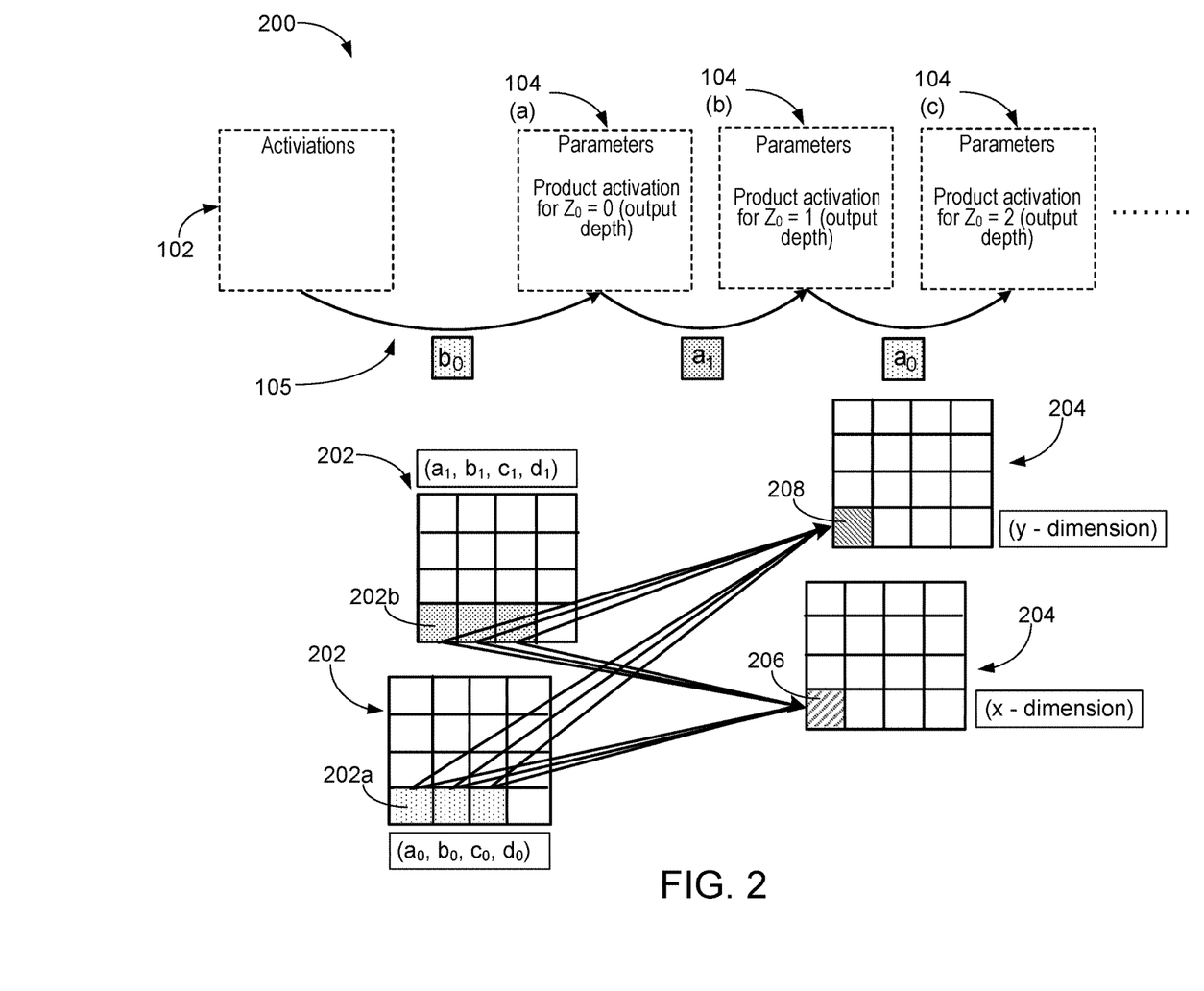
FIG. 2 illustrates an example computation structure that includes activations and multiple parameter structures for an output depth greater than one.

FIG. 2 illustrates an example computation structure 200 that includes an activation structure and multiple parameter structures for an output feature depth greater than one. In some implementations, a neural network can have multiple layers that generate outputs that have multiple output feature depths. In some implementations, each parameter structure can be responsible for a respective one of the output depths. Hence, computation structure 200 depicts a scalable computing structure in which additional parameter structures 104 a/b/c are added to facilitate computations associated with N number of output depths. N is a variable and can have an integer value that ranges from, for example, 1 to 5, or alternatively, 1 to N depending the preferences or needs of a computing system designer.

As shown by data path 105, individual input activation values for elements associated with data structure 102a can be fed to each parameter structure 104a/b/c for use in computations performed by multiply operators associated with respective parameter structures 104. Each parameter structure 104 can then pass an activation value received from its left neighbor to its right neighbor in a pipelined manner. Alternatively, activations can be provided and consumed by each parameter structure 104 at the same time.

Matrix 202 can represent an example matrix structure that corresponds to activations 102. More specifically, element row 202a can correspond to data structure 102a and element row 202b can correspond to data structure 102b. In general, and by way of example, a first parameter structure 104 (1) is accessed to perform computations associated with space 206 and a second parameter structure 104 (2) is accessed to perform computations associated with space 208. Although not shown, additional computations can also be performed corresponding to the z-dimension. As an example, element row 202a can be in an R plane of an RGB image and element row 202b can be in a G plane of the same RGB image. An example convolutional layer of a neural network typically produces multiple output features. Example output features can include an output feature for classifying an apple, and another output feature for classifying a banana. Regarding data structures 204, space(s) 206 and 208 can represent different planes for different classifications.

Figure 3:
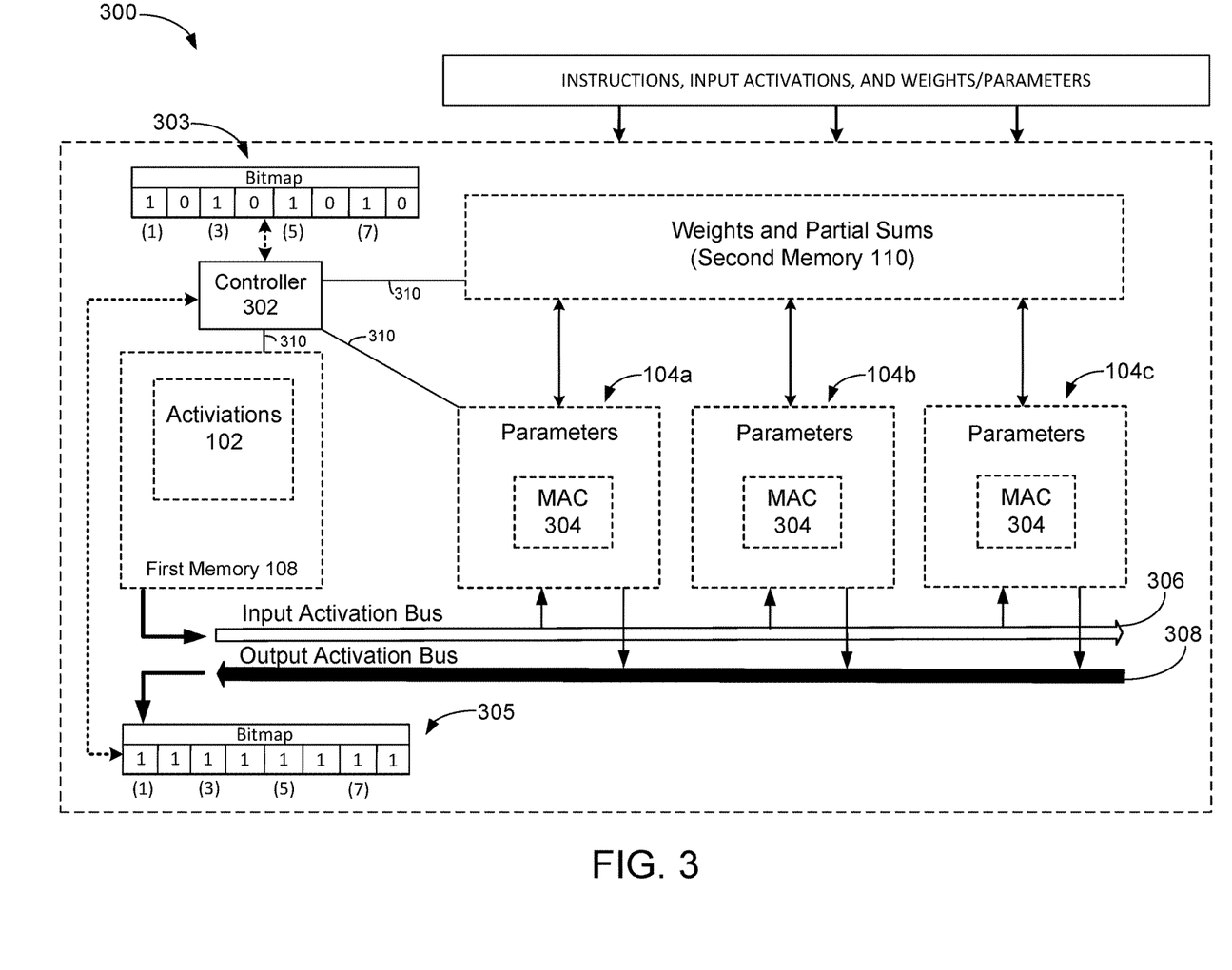
FIG. 3 illustrates an example computation system for feeding input activations to one or more parameters.

FIG. 3 illustrates an example compute system 300 for feeding input activations to one or more parameter structures. Compute system 300 generally includes a controller 302 that provides one or more control signals 310 to cause input activations for activation structure 102 to be either stored to or retrieved from a memory address of memory bank 108. Likewise, controller 302 also provides one or more control signals 310 to cause weights for parameter structure 104a/b/c to be either stored to or retrieved from a memory address of memory bank 110. Compute system 300 further includes one or more multiply accumulate (MAC) cell/unit(s) 304, an input activation bus 306 and an output activation bus 308. Control signals 310 can, for example, cause memory bank 108 to provide one or more input activations unto input activation bus 306, cause memory bank 110 to provide one or more weights to parameter structure 104 a/b/c, and/or cause MAC unit 304 to perform computations that produce output activations that are provided to output activation bus 308.

Controller 302 can include one or more processing units and memory. In some embodiments, processing units of controller 302 can include one or more processors (e.g., microprocessors or central processing units (CPUs)), graphics processing units (GPUs), application specific integrated circuits (ASICs), or a combination of different processors. In alternative embodiments, controller 302 can include other storage or computing resources/devices (e.g., buffers, registers, control circuitry, etc.) that provide additional processing options for performing one or more of the determinations and calculations described in this specification.

In some implementations, processing unit(s) of controller 302 executes programmed instructions stored in memory to cause controller 302 and compute system 300 to perform one or more functions described in this specification. The memory of controller 302 can include one or more non-transitory machine-readable storage mediums. The non-transitory machine-readable storage medium can include solid-state memory, magnetic disk, and optical disk, a portable computer diskette, a random access memory (RAM), a read-only memory (ROM), an erasable programmable read-only memory (e.g., EPROM, EEPROM, or Flash memory), or any other tangible medium capable of storing information.

In general, compute system 300 is an example compute unit or tile and can include additional hardware structures to perform computations associated with multi-dimensional data structures such as tensors, matrices and/or data arrays. In some implementations, input activation values can be pre-loaded to memory bank 108 for activation structure 102 and weight values can be pre-loaded to second memory bank 110 using data values received by compute system 300 that arrive at a compute system 300 from an external or higher level control device associated with a neural network hardware computing system.

In some implementations, system 300 receives instructions that define a particular compute operation to be performed by system 300. Moreover, controller 302 can execute programmed instructions to, for example, analyze a data stream associated with the received input activations. Analyzing the input activation data stream can enable controller 302 to detect or determine whether a value associated with each of the input activations is a zero value or a non-zero value. In some implementations, controller 302 analyzes an example input activation data stream and maps each detected zero activation value and each detected non-zero activation value to bitvector or bitmap 303.

As shown in FIG. 3, bitmap 303 can use binary values to map detected zero value input activations and detected non-zero value input activations. For example, a binary value of "0" can correspond to a detected zero input activation value and a binary value of "1" can correspond to a detected non-zero input activation value. For example, bitmap 303 can be an 8-bit bitmap in which odd numbered bit positions that include a binary "1" correspond to non-zero activation values and even numbered bit positions that include a binary "0" correspond to zero activation values.

Controller 302 can cause input activations to be stored in memory bank 108. In general, data values stored in memory bank 108 are typically each written to a respective memory address location. The address location in memory bank 108 can then be accessed by an example control device (e.g., controller 302) when a data value such as an input activation is needed to perform a particular compute operation. Controller 302 can use bitmap 303 to create an index of memory address locations that include non-zero input activation values.

In some implementations, controller 302 uses bitmap 303 to determine which input activations to write to memory bank 108. For example, analysis of bitmap 303 can indicate that only activation values corresponding to bitmap positions 1, 3, 5, 7 (non-zero values) should be written to address locations in memory bank 108. Moreover, data values associated with bitmap positions 2, 4, 6, 8 (zero values) can either be discarded or written to memory address locations which may or may not be accessed by controller 302 when activation values are provided to input bus 306. Thus, bitmap 303 can be used as a basis to compress zero activation values in which compression occurs when zero value input activations are not written to memory address locations, thereby reducing the overall memory usage and freeing address locations for storing other data values.

Controller 302 can provide one or more control signals 310 to memory bank 108 to load input activations, from memory bank 108, onto input activation bus 306 and provide the values to an array of computational units that include MAC 304. In some implementations, bitmap 303, or the non-zero memory address index that corresponds to bitmap 303, can be referenced by controller 302 so as to determine which memory address values should be accessed to provide non-zero activation values. Activation values are provided by controller 302 from memory bank 108 and onto data bus 306.

In some implementations, the input activations are provided, at least in part, from a memory address location associated with the index or bitmap 303. In other implementations, controller 302 can detect or determine, based on one of bitmap 303 or the index, whether an input activation that is provided has a zero value. In response to making this determination, controller 302 can then provide a control signal to unit or MAC 304 in the computational array to prevent, stall, or otherwise inhibit the occurrence of an unnecessary multiply operation (e.g., a multiply by zero). Within compute system 300, energy savings can be realized from providing a zero activation value and subsequently or simultaneously disabling a compute operation associated with that activation.

As discussed above, the index includes all memory address locations having input activations with non-zero values. Data bus 306 is accessible by one or more units of a computational array. The units of the computational array can receive, from data bus 306, one or more non-zero activation values to perform computations relating to matrix multiplication based on the received activation values. In some implementations, compute system 300 will only provide input activations from memory address locations that correspond to the indexed addresses. Thus, no zero activations will be provided to input bus 306 and so, no compute operations will be disabled or otherwise prevented from occurring. When compute system 300 uses this communication scheme, computational efficiency can be enhanced or accelerated by eliminating multiplication by zeros.

For a given compute cycle, compute system 300 can require access to an element of activation structure 102 and parameter structure 104 to execute multiplication operations associated with inference computations for a neural network layer. As noted above, certain memory address values for memory bank 108 and memory bank 110 can correspond to elements of activation structure 102 and parameter structure 104 respectively.

For a cycle in which computations are performed, controller 302 will provide one input activation value at a time and the array of computational units including MAC cell 304 will multiply an activation with a weight to produce different output activations for a given input activation. Each element (described above as a parameter structure) or MAC cell 304 of the array of computational units can be responsible for different output depths of a neural network layer. In general, whenever controller 302 detects a zero activation value, controller 302 can either: 1) not store that activation value in memory bank 108; 2) not provide the activation value, or 3) provide the value and provide a control signal to a particular computational unit to cause the unit to not perform a multiply operation corresponding to that zero activation value.

The array of computational units is fully controlled by controller 302, which can determine, based on detection of a zero activation value, when there is a need to skip or prevent a particular computation. Thus, there is no need for additional complex hardware structures within the array of computational units to skip a particular computation. Furthermore, input activation values can be analyzed upon arriving at compute system 300 for storage in memory bank 108. In response to analyzing the input activations, controller 302 can execute an instruction to efficiently compress activation data by storing only non-zero values in memory 108, thereby saving memory storage space and corresponding bandwidth.

When compute system 300 receives input activations and weights, controller 302 can, for example, execute one or more direct memory access operations. Execution of these memory access operations includes storing, in address locations of memory bank 108, input activations corresponding to dimensional elements of activation structure 102. Likewise, controller 302 can also store, in address locations of memory bank 110, parameters corresponding to dimensional elements of parameter structure 104. In addition to bitmap 303, controller 302 can further include one or more address registers that maintain the memory addresses from which a particular input activation (e.g., having a zero value or non-zero value) will be fetched. Moreover, the one or more registers will also store the memory addresses from which a corresponding weight is fetched to be multiplied with the particular input activation.

As discussed above, controller 302 identifies memory addresses for non-zero activation values based, in part, on bitmap 303. In some implementations, controller 302 reads bitmap 303 and determines, for example, at least two memory addresses that have non-zero activation values. If controller 302 is configured to provide, and subsequently skip or disable computes for, zero activation values, then controller 302 may also determine at least one memory address that has a zero activation value. In this implementation, controller 302 can reference the above mentioned registers to determine a corresponding weight (and memory address) for the first input activation and to determine a corresponding weight (and memory address) for the second input activation.

As noted above, controller 302 maintains one or more address registers in memory. So, to mitigate or prevent any potential misalignment of operands (input activation and weight), upon detection of the zero value input activation, controller 302 can disable the corresponding compute unit, skip loading a particular weight, and retrieve the appropriate corresponding weight (and memory address) for the next non-zero input activation to resume computing output activations for a given neural network layer.

In some implementations, the output activations computed at a first neural network layer are used as input activations to a next second layer in the network, e.g., a next hidden layer or the output layer of the network. In general, each layer of the neural network generates an output from a received input in accordance with current values of a respective set of parameters. In some instances, controller 302 can execute programmed instructions (i.e., output logic) to analyze data streams associated with output activations provided to output activation bus 308. Analyzing the output activation data stream can enable controller 302 to detect or determine whether a value associated with each of the output activations is a zero value or a non-zero value. Controller 302 can analyze an example output activation data stream and map each detected non-zero activation value to bitmap 305. Mapped non-zero activation values in bitmap 305 can be used to supply only non-zero values as input activations to a subsequent compute system 300 that is responsible for computations associated with the next second layer in the network.

In alternative implementations, there can be some compute operations in which a single non-zero input activation is used as an operand for several multiply operations covering a variety of weights for a given dimensional element of parameter structure 104 (i.e., iterate a "x" or "y" dimension). For example, when controller 302 causes memory bank 108 to provide a first input activation (e.g., non-zero value), parameter structure 104a receives the activation and a corresponding weight at a given address is also loaded to parameter structure 104a. Parameter structure 104a will proceed to update a particular number of partial sums (e.g., denoted by variable "K") that the first input activation affects over K compute cycles. As a result, for these K cycles, parameter structure 104a will receive no additional input activations. Controller 302 can then provide a control signal to memory bank 108 to cause the next input activation to be provided to input activation bus 306.

Figure 4:
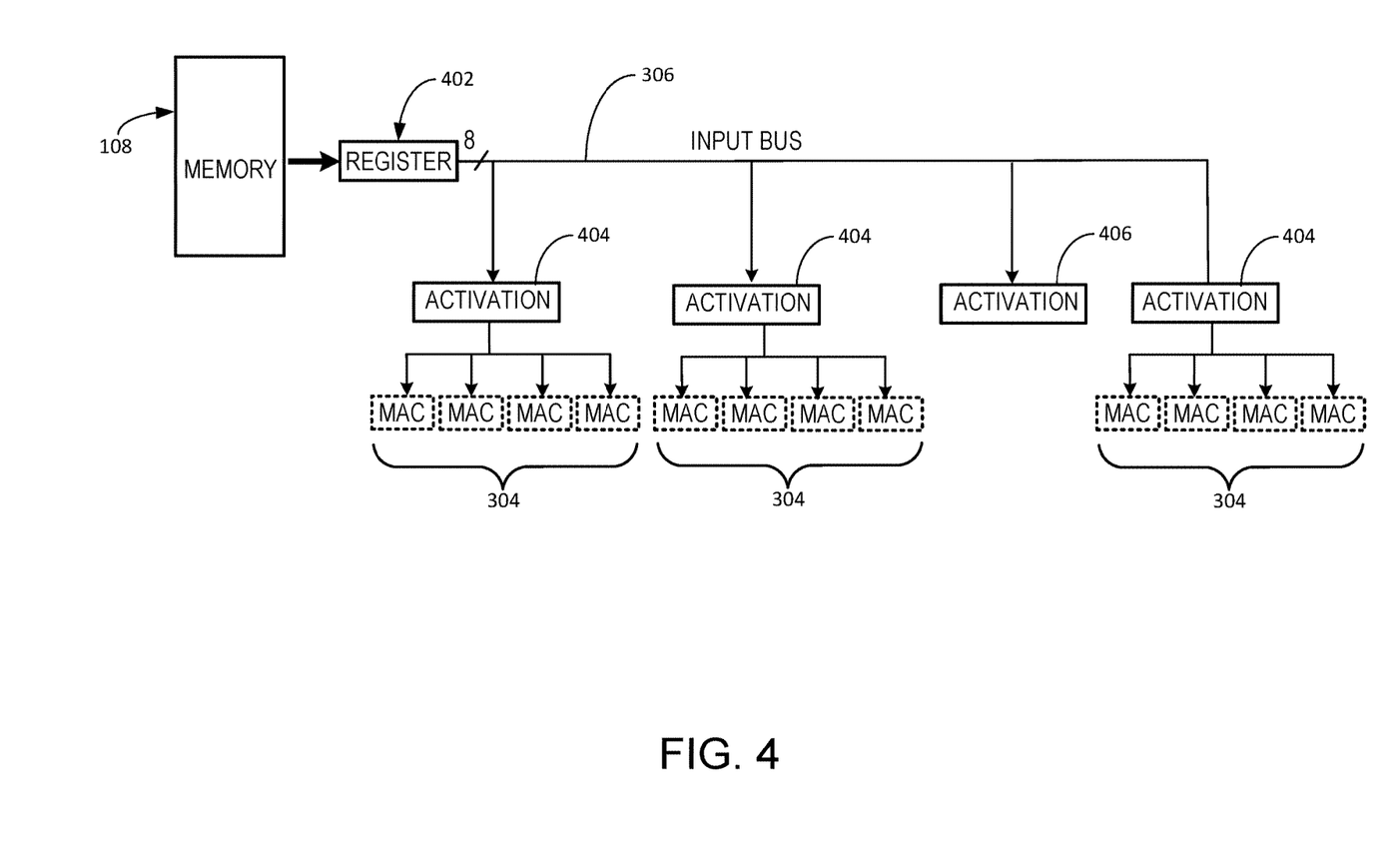
FIG. 4 illustrates an example architecture that includes a memory unit providing input activations to one or more multiply accumulate (MAC) operators.

FIG. 4 illustrates an example architecture that includes a memory bank 108 that provides activations 404 via input bus 306 to one or more multiply accumulate (MAC) operators. A shift register 404 can provide shift functionality whereby activations 404 are sent out one at a time onto input bus 306 for receipt by one or more MAC operators in a MAC cell 304. As shown, in one implementation, activation 406 may have an activation value of zero and, therefore, may not be consumed by a MAC cell 304.

In general, MAC cells 304 comprising MAC operators are defined as compute units that calculate a partial sum and, in some implementations, are configured to write a partial sum datum to output bus 308. As shown, cells 304 may consist of one or more MAC operators. In one implementation, the number of MAC operators in MAC cell 304 is referred to as the issue width of the cell. As an example, a dual issue cell refers to a cell with two MAC operators that can compute the multiplication of two activations values (from memory bank 108) with two parameters (from memory 110) and perform an addition between the results of the two multipliers and the current partial sum.

As described above, input bus 306 is a communication bus that provides input activations to MAC operators of the linear unit (i.e., MAC array 304). In some implementations, the same input is shared between all MAC operators. The width of input bus 306 must be wide enough to supply the input activations to the corresponding number of cells for a given MAC array 304. Consider the following example to illustrate the structure of input bus 306. When the number of cells in the linear unit equals four and the activation width equals eight bits, input bus 306 can be configured to provide up to four input activations every cycle. In this example, every cell in MAC array 304 will only access one out of the four activations that are provided.

In some examples, instruction data 312 can indicate that cells of MAC array 304 will need to perform computations using the same input activation. This may be referred to as Zout partitioning within a cell of MAC array 304. Likewise, Zin partitioning within a cell occurs when cells of MAC array 304 need different activations to perform computations. In the former case, the single input activation is replicated four times and four activations read from memory bank 108 are provided over four cycles. In the latter case, a read of memory bank 108 is required every cycle.

Figure 5:
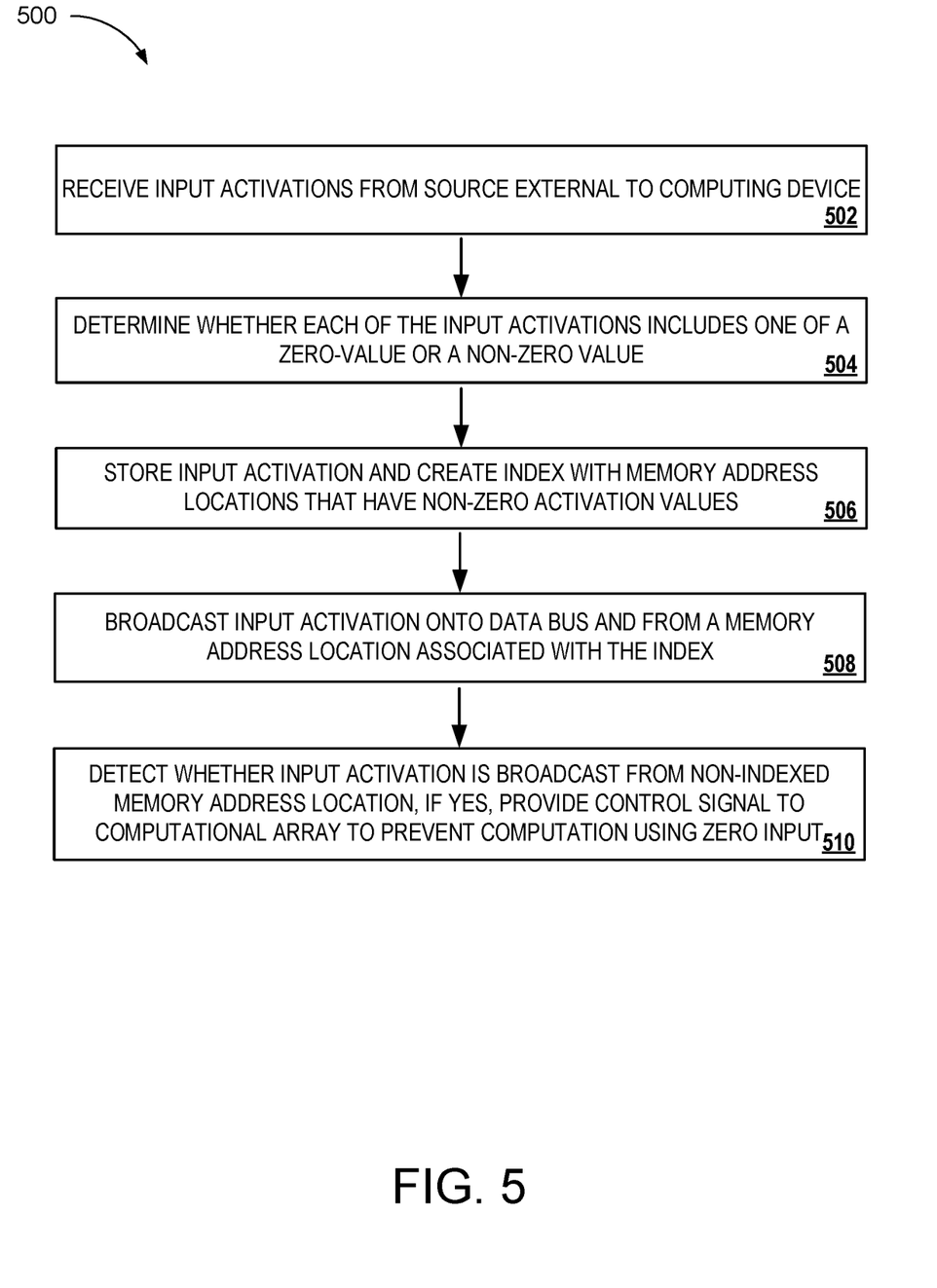
FIG. 5 is an example flow chart of a process for reducing parameter computations and exploiting input data sparsity.

FIG. 5 is an example flow chart of process for reducing parameter computations and exploiting input data sparsity. At block 502, compute system 300 receives input activations that have either a zero activation value or a non-zero activation value. As discussed above, in some implementations, compute system 300 can receive input activations from a host interface device or higher level controller of an example neural network hardware system.

At block 504, controller 302 determines whether each of the input activations is a zero value or a non-zero value. In some implementations, controller 302 analyzes an input activation data stream and maps each detected zero value and non-zero value to bitmap 303 that includes binary values that correspond to zero input activation values ("0") and non-zero input activation values ("1").

At block 506, controller 302 stores, in memory bank 108, received input activations. Storing the input activation can include controller 302 generating an index of one or more memory address locations having input activations that include non-zero values. In some implementations, the index is created based on bitmap 303. For example, because each bit of bitmap 303 indicates either a non-zero activation value or a zero activation value, bitmap 303 can be referenced by controller 302 to create an index of memory address locations having non-zero values when writing input activations to memory bank 108.

At block 508, controller 302 provides, from memory bank 108, at least one input activation onto data bus 306. In some implementations, the input activations are provided, at least in part, from a memory address location identified in the index. As discussed above, the index identifies all memory address locations storing input activations with non-zero values. Data bus 306 is accessible by one or more units of a computational array. The units of the computational array receive, from data bus 306, one or more non-zero activation values to perform computations relating to matrix multiplication. In some implementations, compute system 300 will only provide input activations from memory addresses that correspond to the indexed addresses. When compute system 300 uses this communication scheme, computational efficiency can be enhanced by eliminating multiplication by zeros.

At block 510, in implementations where all activation values are provided rather than only input activations from indexed addresses, controller 302 detects that an input activation is provided from a memory address that is not associated with any indexed addresses that include non-zero activation values. In response to this detecting step, controller 302 can then provide a control signal to at least one unit of the computational array to prevent a multiply operation associated with the zero input. When compute system 300 uses this communication scheme, energy savings can be realized by preventing unnecessary or wasteful computations that yield no useful results (e.g., useful results includes compute of a partial sum or output activation).

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

The processes and logic flows described in this specification can be performed by one or more programmable computers executing one or more computer programs to perform functions by operating on input data and generating output(s). The processes and logic flows can also be performed by, and apparatus can also be implemented as, special purpose logic circuitry, e.g., an FPGA (field programmable gate array), an ASIC (application specific integrated circuit), a GPGPU (General purpose graphics processing unit), or some other processing unit.

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A hardware circuit configured to implement a neural network comprising a plurality of neural network layers, the circuit comprising:
   a controller configured to:
      receive a batch of inputs for processing through a first neural network layer; and
      generate a compressed representation of inputs based on a respective value of each input in the batch of inputs; and
   an address register configured to:
      store a plurality of addresses, wherein each address of the plurality of addresses is an address of a location in memory that stores an input in the compressed representation of inputs, and
   wherein the controller is configured to generate control signals that cause the circuit to:
      retrieve each input in the compressed representation of inputs from a corresponding location in memory based on a respective address of the corresponding location; and
      after retrieving each respective input, process the respective input through the first neural network layer at least by multiplying the input with a corresponding weight value for the first neural network layer to generate an output for the first neural network layer.

2. The circuit of claim 1, comprising a multiply accumulate cell configured to:
   receive the respective input in the compressed representation of inputs from a memory location identified by the respective address stored in the address register;
   receive the corresponding weight value for the first neural network layer; and
   perform the multiplication between the input and the corresponding weight value to generate the output for the first neural network layer.

3. The circuit of claim 2, wherein the compressed representation of inputs comprises fewer inputs than the batch of inputs and each input in the compressed representation of inputs has a non-zero value.

4. The circuit of claim 3, comprising:
   an activation memory configured to store each input in the batch of inputs and each input in the compressed representation of inputs; and
   a parameter memory configured to store a plurality of weight values for each of the plurality of neural network layers.

5. The circuit of claim 4, wherein:
   the controller is configured to generate control signals to store each input in the compressed representation of inputs in a corresponding memory location of the activation memory of the circuit, wherein each memory location of the activation memory is identified by a corresponding address; and
   the address register is configured to store a portion of the addresses that identify memory locations of the activation memory.

6. The circuit of claim 4, comprising:
   a computation unit that includes a plurality of multiply accumulate cells, wherein the computation unit is configured to:
      receive a first input matrix for the compressed representation of inputs, the first input matrix comprising inputs that have a non-zero value;
      receive a set of weight values of a weight matrix for the first neural network layer; and
      process the inputs of the first input matrix through the first neural network layer using the plurality of multiply accumulate cells, comprising performing a matrix multiplication between each input in the first input matrix and a weight value in the set of weight values to generate a plurality of outputs for the neural network layer based on a first quantity of computations.

7. The circuit of claim 6, wherein the computation unit is configured to:
   receive a second input matrix for the batch of inputs, the second input matrix comprising an input that has a zero value and an input that has a non-zero value; and
   process, using the plurality of multiply accumulate cells, the inputs of the second input matrix through the first neural network layer based on a second quantity of computations.

8. The circuit of claim 7, wherein:
   the first quantity of computations to process the inputs of the first input matrix through the first neural network layer is fewer than the second quantity of computations to process the inputs of the second input matrix through the first neural network layer.

9. The circuit of claim 7, wherein the controller is configured to:
   generate control signals to sequentially provide each input in the compressed representation of inputs to a corresponding multiply accumulate cell disposed in the computation unit to process each input in the compressed representation of inputs through the first neural network layer.

10. A method for performing computations using a hardware circuit configured to implement a neural network comprising a plurality of neural network layers, the method comprising:
   receiving, by a controller of the circuit, a batch of inputs for processing through a first neural network layer;
   generating, by the controller, a compressed representation of inputs based on a respective value of each input in the batch of inputs;
   storing, using an address register of the circuit, a plurality of addresses, wherein each address of the plurality of addresses is an address of a location in memory that stores an input in the compressed representation of inputs;

using control signals generated by the controller, retrieving each input in the compressed representation of inputs from a corresponding location in memory based on a respective address of the corresponding location; and after retrieving each respective input, processing the respective input through the first neural network layer at least by multiplying the input with a corresponding weight value for the first neural network layer to generate an output for the first neural network layer.

11. The method of claim 10, comprising:

receiving, by a computation unit of the circuit, i) the respective input in the compressed representation of inputs from a memory location identified by the respective address stored in the address register and ii) the corresponding weight value for the first neural network layer; and performing, using a multiply accumulate cell of the computation unit, the multiplication between the input and the corresponding weight value to generate the output for the first neural network layer.

12. The method of claim 11, wherein the compressed representation of inputs comprises fewer inputs than the batch of inputs and each input in the compressed representation of inputs has a non-zero value.

13. The method of claim 11, comprising:

storing, by an activation memory of the circuit, each input in the batch of inputs and each input in the compressed representation of inputs; and storing, by a parameter memory of the circuit, a plurality of weight values for each of the plurality of neural network layers.

14. The method of claim 13, comprising:

generating, by the controller, control signals to store each input in the compressed representation of inputs in a corresponding memory location of the activation memory of the circuit, wherein each memory location of the activation memory is identified by a corresponding address that is stored in the address register.

15. The method of claim 13, comprising:

receiving, by the computation unit and from the activation memory, a first input matrix for the compressed representation of inputs, the first input matrix comprising inputs that have a non-zero value;

receiving, by the computation unit and from the parameter memory, a set of weight values of a weight matrix for the first neural network layer; and processing, by the computation unit, the inputs of the first input matrix through the first neural network layer using a plurality of multiply accumulate cells disposed in the computation unit, comprising performing a matrix multiplication between each input in the first input matrix and a weight value in the set of weight values to generate a plurality of outputs for the neural network layer based on a first quantity of computations.

16. The method of claim 15, comprising:

receiving, by the computation unit, a second input matrix for the batch of inputs, the second input matrix comprising an input that has a zero value and an input that has a non-zero value; and processing, using the plurality of multiply accumulate cells, the inputs of the second input matrix through the first neural network layer based on a second quantity of computations.

17. The method of claim 16, wherein:

the first quantity of computations to process the inputs of the first input matrix through the first neural network layer is fewer than the second quantity of computations to process the inputs of the second input matrix through the first neural network layer.

18. The method of claim 16, comprising:

generating, by the controller, control signals to sequentially provide each input in the compressed representation of inputs to a corresponding multiply accumulate cell disposed in the computation unit to process each input in the compressed representation of inputs through the first neural network layer.

19. Non-transitory machine-readable storage devices for storing instructions that are executable by one or more processing devices to cause performance of operations for performing neural network computations using a circuit configured to implement a neural network comprising a plurality of neural network layers, the operations comprising:

receiving, by a controller of the circuit, a batch of inputs for processing through a first neural network layer;

generating, by the controller, a compressed representation of inputs based on a respective value of each input in the batch of inputs;

storing, using an address register of the circuit, a plurality of addresses, wherein each address of the plurality of addresses is an address of a location in memory that stores an input in the compressed representation of inputs;

using control signals generated by the controller, retrieving each input in the compressed representation of inputs from a corresponding location in memory based on a respective address of the corresponding location; and after retrieving each respective input, processing the respective input through the first neural network layer, at least by multiplying the input with a corresponding weight value for the first neural network layer to generate an output for the first neural network layer.

20. The machine-readable storage devices of claim 19, wherein the operations comprise:

receiving, by a computation unit of the circuit, i) the respective input in the compressed representation of inputs from a memory location identified by the respective address stored in the address register and ii) the corresponding weight value for the first neural network layer; and performing, using a multiply accumulate cell of the computation unit, the multiplication between the input and the corresponding weight value to generate the output for the first neural network layer.

* * * * *